United States Patent [19]

Jensen et al.

[11] Patent Number: 4,857,129
[45] Date of Patent: Aug. 15, 1989

[54] METHOD OF BONDING THERMOPLASTIC MATERIAL USING RADIO FREQUENCY ENERGY

[75] Inventors: Richard K. Jensen, Salt Lake City, Utah; Barbara Mandano, Flagstaff, Ariz.

[73] Assignee: Plastic Welding Technologies, Inc., Indianapolis, Ind.

[21] Appl. No.: 80,627

[22] Filed: Jul. 31, 1987

[51] Int. Cl.⁴ .................. B32B 31/20; B32B 31/24
[52] U.S. Cl. ........................ 156/273.7; 156/274.4; 156/308.2; 156/323; 156/274.4
[58] Field of Search ............... 219/10.53, 10.63, 10.81; 156/272.2, 272.4, 274.4, 274.6, 275.1, 308.2, 308.4, 333, 273.7, 379.6, 323, 379.7, 379.8, 380.2, 380.3, 380.4, 380.6

[56] References Cited

U.S. PATENT DOCUMENTS 2,570,921 10/1951 Collins .
2,667,437 1/1954 Zoubek .
3,126,307 3/1964 Drittenbass .
3,232,810 2/1966 Reesen .
4,268,338 5/1981 Peterson .

OTHER PUBLICATIONS

M. Rothstein: Dielectric Heating, Encyclopedia of Polymer Science and Technology, pp. 1-23, vol. 5, 1966.

Primary Examiner—Merrell C. Cashion, Jr.
Attorney, Agent, or Firm—Wood, Herron & Evans

[57] ABSTRACT

Thermoplastic materials having a low dielectric loss tangent and loss index are bonded together using radio frequency energy by employing a polyvinyl chloride buffer above and below the materials being bonded while applying pressure and rf energy. The polyvinyl chloride is a highly plasticized polyvinyl chloride which has a bonding temperature lower than the bonding temperature of the material being bonded. In spite of the fact that the bonding temperature of the polyvinyl chloride is lower than the bonding temperature of the low loss material an effecitve bond is produced between the low loss material.

11 Claims, 1 Drawing Sheet

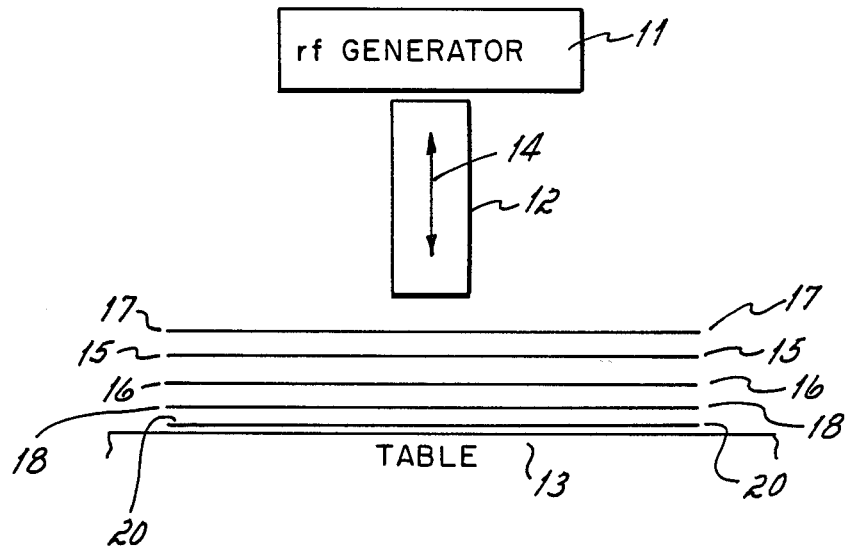

METHOD OF BONDING THERMOPLASTIC MATERIAL USING RADIO FREQUENCY ENERGY

The present invention relates to a method of bonding thermoplastic material using radio frequency energy.

More particularly, the present invention is a method of rf bonding thermoplastic materials which are typically unaffected by radio frequency energy i.e. those having a dielectric loss index lower than about 0.2 at 27 MHz and even as low as 0.0 at 27 MHz.

BACKGROUND OF THE INVENTION

There are many different types of heat sources which are employed to bond thermoplastic materials. Impulse heaters and electric resistance heaters are typically employed over a wide range of thermoplastic materials to form bonds. One type of heating has limited use, radio frequency or rf heating. Electromagnetic energy at radio frequencies is used to efficiently heat certain materials. However it is limited to heating those materials which are referred to as dielectrics. A dielectric material is one in which it is possible to store electrical energy by the application of an electric field. The energy is recoverable when the field is removed. Dielectric heating is the result of the interaction of the electromagnetic energy with various components in the atomic or molecular structure of the dielectric. An alternating electrical field causes oscillatory displacements in the charged components of the dielectric.

The chemical structure of a material determines to a large extent the dielectric nature of a material (typically defined in terms of the dielectric constant). The dielectric constant of a material is defined as the ratio of the capacitance of a material in a given electrode configuration to the capacitance of the same electrode configuration with a vacuum as the dielectric. Its value for any material decreases with increasing frequency showing decreasing response to the electric field. A material absorbs energy at a rate given by the equation $P = 0.555 f E^2 e' \tan d \times 10^{-6}$. In this equation tan d (d is delta) is called a loss tangent or dissipation factor and indicates the fraction of the stored energy which is converted into heat by the dielectric. P=the heat generated in watts which is the dielectric loss; f is the frequency in MHz; E=the field strength in V/cm and e' is the dielectric constant. The loss index is the product of the dielectric constant of a material and the loss tangent.

The ease with which any material can be dielectrically heated is thus determined by its dielectric constant and its loss tangent. Materials which have relatively good response to dielectric heating include melamine-formaldehyde resins, phenol formaldehyde resins, polyurethanes, polyvinyl chloride, and urea-formaldehyde resins. Materials which have relatively little response to dielectric heating include the silicones, polytetrafluoroethylene, polystyrene, polypropylene and polyethylene which is particularly difficult to heat dielectrically.

Dielectric heating has been most useful in welding thermoplastic materials which have appropriate dielectric constants and loss tangents. Typically two pieces of thermoplastic material are sealed together by positioning them between a metallic electrode and a steel bed plate of a pneumatically operated press. The electrode is pressed against the thermoplastic material as high frequency voltage is applied causing the plastic to heat and melt. The metallic electrode and steel bed do not get hot under the influence of the high frequency energy and in fact draw heat from the material being bonded.

When the plastic is melted, power is turned off and the cool metal electrode and bed rapidly refreeze the plastic. Refreezing under pressure provides a good bond. Further, the outer surfaces of the film can be kept below the melting point and thus maintain their original characteristics.

Vinyl film is most frequently bonded using this method. This method per se is unsuitable for bonding a material having a low loss index. Accordingly, methods have been developed whereby materials with such low factors can be bonded. Particularly these methods for radio frequency bonding of low loss plastics are disclosed in several U.S. patents and these include:

Collins U.S. Pat. No. 2,570,921
Zoubek U.S. Pat. No. 2,667,437
Drittenbass U.S. Pat. No. 3,126,307
Reesen U.S. Pat. No. 3,232,810
Peterson U.S. Pat. No. 4,268,338.

For example the Collins reference discloses a method of bonding thermoplastic material such as polyethylene using high frequency radio waves. Collins suggests that a wide range of different materials which have a high power factor (roughly equivalent to their loss index) including polyvinyl compounds can be placed above and below materials which have a low power factor or loss tangent and then bonding or welding of these materials using rf energy.

The Zoubek patent discloses placing a buffer material between radio frequency generating electrodes and the material being bonded. Zoubek indicates that the buffer material must have a fairly high dielectric loss index, high thermal conductivity and a high softening point relative to the material to be bonded. The only material specified by Zoubek as an appropriate buffer was nylon. Nylon has a low loss index at 27 MHz but higher at higher frequencies.

Drittenbass discloses the use of polyvinyl chloride as a buffer on one side of two plys of a thermoplastic material to be radio frequency welded. Drittenbass specifically discloses the use of a polyvinyl chloride impregnated sheet.

These patents generally disclose higher frequency equipment (but see Drittenbass). High frequency equipment generally requires the use of a small electrode to provide even heating or power distribution across the entire electrode. This is not practical for high frequency equipment which employs a long bar electrode having a length substantially longer than 12 inches, generally 36' or more in length.

Over the years the radio frequency bonding equipment has been modified. The original equipment typically operated at 12 to 60 and some equipment operates as high as several hundred MHz. Current equipment is generally limited to 27.12 ±0.26 MHz. This in effect has caused a reduction in the amount of energy absorbed by a dielectric. Although the field strength has been increased somewhat to compensate, this current equipment does not heat dielectrics as readily as equipment has in the past. In fact it is extremely difficult to use the buffers disclosed in many of the references to dielectrically bond even polyethylene which has a relatively low melting point. Generally efore any bond occurs, there is breakdown which basically burns a hole through the polyethylene.

BRIEF DESCRIPTION OF THE INVENTION

The present invention is premised on the realization that low loss thermoplastic material can be bonded using rf energy by poitioning a highly plasticized polyvinyl chloride sheet or buffer above and below the low loss material and applying rf energy and pressure through this composite. This functions in applications where the thermoplastic being bonded has a minimum bonding temperature and pressure which is substantially greater than the bonding temperature and pressure of the PVC. In other words, the thermoplastic being bonded, bonds under conditions at which polyvinyl chloride should flow. Surprisingly even though the polyvinyl chloride should drastically soften and totally flow away from the composite structure without heating the low loss material to its bonding temperature, in fact a very good, strong bond can be formed which possesses all of the positive characteristics of a dielectric bond.

Materials such as polyvinyl fluoride, high density polyethylene, polypropylene, and the like can be easily bonded using double plasticized polyvinyl chloride as a buffer above and below the materials when the materials are subjected to pressure and radio frequency energy. Thus, the present invention provides a method of bonding materials previously thought to be unbondable using radio frequency bonding equipment operating at 27.12 MHz. The advantages of the present invention will be further appreciated in light of the following detailed descriptions and drawing in which:

BRIEF DESCRIPTION OF DRAWING

The FIGURE is a cross-section diagrammatic depiction of the method of the present invention.

DETAILED DESCRIPTION OF THE INVENTION

According to the present invention two layers of thermoplastic materials having a low dielectric constant and loss tangents are bonded together using radio frequency energy by positioning the two materials to be bonded referred to hereinafter as the low loss material between an upper and lower sheet of a flexible highly plasticized polyvinyl chloride film and subjecting this composite to pressure and radio frequency energy sufficient to cause bonding of the low loss material to itself or to a different substance.

As shown diagrammatically in the figure, there is a dielectric film sealer 11 having a narrow, elongated brass electrode 12 and a steel platen 13. The electrode can be pneumatically, mechanically or hydraulically raised or lowered by an actuation means which is indicated by arrow 14. The low loss materials 15 and 16 are positioned between the platen and the brass electrode. Between the brass electrode and layer 15 is positioned a film of double plasticized polyvinyl chloride 17. Likewise between the steel platen 13 and the low loss film 16 is positioned a second sheet of double plasticized polyvinyl chloride 18. An optional layer of polytetrafluoroethylene 20 separates the metal platen from PVC layer 18. It is important that the polyvinyl chloride buffer be in direct physical contact above and below the low loss materials.

The brass electrode 12 can be raised and lowered as indicated by arrow 14 and applies pressure to the polyvinyl chloride 17-low loss material 15-low loss material 16-polyvinyl chloride 18 composite. As the brass electrode 12 is pressed down rf energy is applied creating a radio frequency field. Sufficient pressure is applied for a period of time effective to cause the low loss materials to heat and bond.

The present invention will function primarily with any currently used rf bonding equipment. Preferably rf bonding equipment having a metallic electrode which is pressed against a metal platen is preferred, preferably one which includes a narrow elongated bar electrode such as the Thermatron models K and KF. These models generally allow for setting power, preheat time, heat time and cooling time along with applied pressure. Modification of these various components aid in providing a better bond. These characteristics will be discussed relative to the Examples.

The polyvinyl chloride used in the present invention must be a plasticized, flexible polyvinyl chloride sheet. Various plasticizers will effectively soften the polyvinyl chloride making it flexible and suitable for use in the present invention. Suitable plasticizers includes the phthalates such as dimethylphthalates, dibutylphthalate, bis(2-ethylhexyl)phthalate, ditridecylphthalate, dicyclohexylphthalate, butylbenzyl phthalate, the adipates such as bis(2-ethylhexyl)adipate, diisodecyladipate, the phosphates such as tricresylphosphate, tris(2-ethylhexyl)phosphate, the phthalylglycolates such as butylphthalylglycolate, sebacates, e.g., di-(2-ethylhexyl) sebacate, diethyl sebacate, dibutyl sebacate, azelates, e.g., dibutyl azelate, di(2-ethylhexyl) azelate n-octyl-and n-decyl azelate, epoxidized soybean oil, and octyl epoxytallate, polyesters, epoxides, sulfonamides, chlorinated paraffins, etc. These are added in a wide range of amounts. Generally these can be added from 5 parts per hundred resin to in excess of 100 parts per hundred resin.

The plasticizer content is important for the present invention. The plasticizer raises the loss index of the PVC thus causing it to be heated more readily in an rf field.

The plasticizer also lowers the bonding and softening temperature of the PVC. Although this latter affect is to a certain degree negative, it makes the PVC more flexible providing better direct contact with the low loss material. Direct contact between the PVC buffer and low loss material is very important to provide uniform heat transfer, particularly when the electrode is a narrow elongated bar.

In terms of physical condition, there should be sufficient plasticizer so that under bonding conditions, the PVC is softer than the low loss material. This is not only apparently necessary, but also is surprising because one would expect the PVC to flow away from the bond area under the pressure of the bar electrode. Generally the PVC will have a bonding temperature below 220° F. and the material being bonded will have a temperature above 220° F.

The preferred polyvinyl chloride for use in the present invention is one referred to as a double polished, double plasticized polyvinyl chloride such as 20 mil double polished, double plasticized polyvinyl chloride sold by Robeco having 3S hand. Double plasticized indicates that the PVC has more than about 50 phr plasticizer. This preferred material has a softening point of about 120° F. shaping temperature of 150° F. and a melting temperature of 212° F. (At 212° F. this material flows under moderate pressure. Plasticized PVC technically has no melting point. This should also be considered its bonding temperature).

The thickness of the polyvinyl chloride sheeting buffers can vary depending on the machine used. With certain applications thicker polyvinyl chloride is required in order to obtain a better seal. Basically, the thickness may need to be increased to fill the gap between the electrode and the platen and insure adequate pressure is applied against the composite. Generally, the thickness can range from about 5 mils to about 40-50 mils with 20 mils being preferred.

For purposes of the present invention, the low loss material is one that has a bonding temperature or melting temperature higher than the temperature at which the polyvinyl chloride will flow at a given pressure. For purposes of the present invention, the bonding temperature is the temperature at which a material can be bonded to itself under pressure of about 20 psi within about a 5 second period. The particular definitions of bonding temperature, softening temperature and melting temperature may vary. However, as long as the same test is applied to both the PVC buffer and the low loss material, the particular definition used or test applied is not important.

These low loss materials include, for example, polyvinylfluoride (Tedlar sold by DuPont), bonding temperature of 400°-425° F. spun bonded polyethylene (Tyvek) having a melting point at 275° F. polyetheretherketone (Peek) having a bonding temperature in excess of 334° C. (633° F.), polypropylene, polyester, polyamides such as nylon, particularly nylon 66, linear low density polyethylene, linear high density polyethylene, polyethylene terephthalate, and the like.

The primary limitations of the low loss material is that it have a dielectric loss index which is so low that it is unsuitable for bonding using current rf bonding equipment generally less than 0.2 and generally less than 0.1 and many less than 0.01 at 27 MHz and further that it have a melting point or a bonding temperature and pressure which is higher than the point at which polyvinyl chloride buffer will flow, i.e., its bonding temperature.

The invention will be further appreciated in light of the following detailed examples. In the following examples a 10 kilowatt Cosmos (Kaybar) rf bonding machine was used. In each of these applications a Teflon buffer was used between the lower layer of PVC and the metal platen to prevent arcing and sticking. Thus in each of these examples a layer of teflon was laid over the metal platen followed by the PVC buffer and two layers of the thermoplastic being bonded to itself followed by a second layer of the PVC. The brass electrode was pressed down against this composite and contacted the upper PVC layer. The preseal time, seal time, cooling time, pressure and power were adjusted in attempts to bond various thermoplastics. Preseal time and cooling time indicate the time before and after heating when the electrode was pressed against the composite without the presence of an rf field.

EXAMPLE 1

Plastic being bonded: Tedlar (PVF) to Tedlar
Buffer: 20 mil double polished, double plasticized PVC (Robeco-3S hand)

| TEST CONDITIONS | |
| --- | --- |
| Preseal time: | 1 second |
| Seal time: | 3 seconds |
| Cooling time: | 1 second |
| Pressure: | 60-80 PSI |
| Power control setting: | 45% |
| RESULTS | |
| Good seal | |

EXAMPLE 2

Plastic being bonded: Tedlar (PVF) to Tedlar
Buffer: 20 mil double polished, double plasticized PVC (Robeco-3S hand)

| TEST CONDITIONS | |
| --- | --- |
| Preseal time: | 1 second |
| Seal time: | 3 seconds |
| Cooling time: | 1 second |
| Pressure: | 40 PSI |
| Power control setting: | 45% |
| RESULTS | |
| Good seal | |

EXAMPLE 3

Plastic being bonded: Tedlar
Buffer: 20 mil double polished, double plasticized PVC (Robeco-3S hand)

| TEST CONDITIONS | |
| --- | --- |
| Preseal time: | 1 second |
| Seal time: | 3 seconds |
| Cooling time: | 1 second |
| Pressure: | 25 PSI |
| Power setting: | 45% |
| RESULTS | |
| Good seal | |

EXAMPLE 4

Plastic being bonded: Tedlar
Buffer: 20 mil double polished, double plasticized PVC (Robeco-3S hand)

| TEST CONDITIONS | |
| --- | --- |
| Preseal time: | 1 second |
| Seal time: | 4 seconds |
| Cooling time: | 2 seconds |
| Pressure | 25 PSI |
| Power setting: | 45% |
| RESULTS | |
| A weak seal was formed | |

EXAMPLE 5

Plastic being bonded: Tedlar
Buffer: 20 mil double polished, double plasticized PVC (Robeco-3S hand)

| TEST CONDITIONS | |
| --- | --- |
| Preseal time: | 1 second |
| Seal time: | 4 seconds |
| Cooling time: | 1 second |
| Pressure: | 25 PSI |
| Power setting: | 45% |
| RESULTS | |
| A medium to slight seal. | |

EXAMPLE 6

Plastic being sealed: 4 mil Tedlar greenhouse film with shiny surface
Buffer: 20 mil double polished, double plasticized PVC (Robeco-3S hand)

| TEST CONDITIONS | |
|---|---|
| Preseal time: | 1 second |
| Seal time: | 3 seconds |
| Cooling time: | 1 second |
| Pressure: | 40 PSI |
| Power setting | 45% |
| RESULTS | |
| Good seal was obtained. | |

EXAMPLE 7

Plastic being sealed: 4 mil Tedlar greenhouse film with shiny surface
Buffer: 20 mil double polished, double plasticized PVC (Robeco-3S hand)

| TEST CONDITIONS | |
|---|---|
| Preseal time: | 1 second |
| Seal time: | 3 seconds |
| Cooling time: | 1 second |
| Pressure: | 60 PSI |
| Power setting | 45% |
| RESULTS | |
| Good seal, thin at edges. | |

EXAMPLE 8

Plastic being sealed: 4 mil Tedlar greenhouse film with shiny surface
Buffer: 20 mil double polished, double plasticized PVC (Robeco-3S hand)

| TEST CONDITIONS | |
|---|---|
| Preseal time: | 1 second |
| Seal time: | 3 seconds |
| Cooling time: | 1 second |
| Pressure: | 25 PSI |
| Power setting: | 45% |
| RESULTS | |
| Slight seal | |

EXAMPLE 9

Plastic being sealed: 4 mil Tedlar greenhouse film with shiny surface
Buffer: 20 mil double polished, double plasticized PVC (Robeco-3S hand)

| TEST CONDITIONS | |
|---|---|
| Preseal time: | 1 second |
| Seal time: | 3 seconds |
| Cooling time: | 1 second |
| Pressure: | 40 PSI |
| Power setting: | 50% |
| RESULTS | |
| Good seal with some arcing | |

EXAMPLE 10

Plastic being sealed: 4 mil Tedlar greenhouse film with shiny surface
Buffer: 20 mil double polished, double plasticized PVC (Robeco-3S hand)

| TEST CONDITIONS | |
|---|---|
| Preseal time: | 1 second |
| Seal time: | 3 seconds |
| Cooling time: | 1 second |
| Pressure: | 40 PSI |
| Power setting: | 50% |
| RESULTS | |
| Good seal with some arcing. | |

EXAMPLE 11

Plastic being sealed: 4 mil Tedlar greenhouse film with shiny surface
Buffer: 20 mil double polished, double plasticized PvC (Robeco-3S hand)

| TEST CONDITIONS | |
|---|---|
| Preseal time: | 1 second |
| Seal time: | 3 seconds |
| Cooling time: | 1 second |
| Pressure: | 40 PSI |
| Power setting: | 53% |
| RESULTS | |
| Good seal with some breakdown and the buffer tended to flow. | |

EXAMPLE 12

Plastic being sealed: 4 mil Tedlar greenhouse film with shiny surface
Buffer: 20 mil double polished, double plasticized PVC (Robeco-3S hand)

| TEST CONDITIONS | |
|---|---|
| Preseal time: | 1 second |
| Seal time: | 3 seconds |
| Cooling time: | 1 second |
| Pressure: | 40 PSI |
| Power setting: | 35% |
| RESULTS | |
| A good seal | |

EXAMPLE 13

Plastic being sealed: 4 mil Tedlar greenhouse film with shiny surface
Buffer: 20 mil double polished, double plasticized PVC (Robeco-3S hand)

| TEST CONDITIONS | |
|---|---|
| Preseal time: | 1 second |
| Seal time: | 3 seconds |
| Cooling time: | 1 second |
| Pressure: | 60-80 PSI |
| Power setting: | 45% |
| RESULTS | |
| A good seal | |

Several factors assist in obtaining a satisfactory bond according to the present invention. The direct contact of the PVC buffer to the low loss material is critical. Further the flexibility of the PVC appears to play an important role. The flexibility eliminates any problems that may occur due to imperfections in the low loss materials as well as in the electrode or platen. Maintaining the thickness of the PVC between 10 and 20 mils seems to provide a good bond between the low loss materials.

The present invention can be varied to provide laminates or bonds between dissimilar but compatible materials. For example, the present invention can be used to bond a low loss material to a non-polymeric material or to a thermoset polymeric material providing the two are compatible by simly substituting the thermoset or non-polymeric material for one layer of the low loss material as described above. Other variations of the present invention will be obvious to those of ordinary skill in the art. The preceding was a general description of the present invention.

However, the present invention is defined and limited only by the following descriptions in which we claim:

1. A method of bonding a first thermoplastic material having a first and second surface to a second adjacent material having a first and second surface said materials each having a dielectric loss factor less than about 0.1 at 27 MHz; the method comprising:
   positioning said first and second material so that their respective first surfaces overlie and contact each other;
   positioning plasticized polyvinyl chloride sheets each having a first surface above and below the first and second materials with one each of said first surfaces of said first and second polyvinyl chloride sheets in contact with one each of said second surfaces of said first and second thermoplastic materials, said first thermoplastic material having a minumum bonding temperature higher than a temperature at which said plasticized polyvinyl chloride flow;
   applying pressure from above and below said polyvinyl chloride thereby comprising said first and second materials together and applying rf energy at about 27 MHz to the polyvinyl chloride sheets and first and second materials to effectively soften and then bond said first and second materials to each other.

2. The method claimed in claim 1 wherein said first and second thermoplastic materials are films.

3. The method claimed in claim 2 wherein said first and second materials are the same thermoplastic materials.

4. The method claimed in claim 1 wherein polyvinyl chloride has more than 50 phr plasticizer.

5. The method claimed in claim 1 wherein said polyvinyl chloride has a bonding temperature less than about 220° F.

6. The method claimed in claim 3 wherein said first thermoplastic material is polyvinyl fluoride.

7. The method claimed in claim 3 wherein said first thermoplastic material is high density polyethylene.

8. The method claimed in claim 3 wherein said first thermoplastic material is polypropylene.

9. The method claimed in claim 3 wherein said first thermoplastic material is spun bonded polyethylene.

10. The method claimed in claim 3 wherein said thermoplastic material is polyetheretherketone.

11. A method of bonding a first surface of a first sheet of thermoplastic material to a first surface of a second adjacent sheet of thermoplastic material wherein said first surfaces are in contact with each other, said materials having the same chemical composition having a dielectric loss factor less than about 0.1 at about 27 MHz and a bonding temperature comprising:
    positioning a first sheet of double plasticized polyvinyl chloride above said first sheet of thermoplastic material with a first surface of said first polyvinyl chloride sheet in contact with a second surface of said first thermoplastic material and positioning a second sheet of double plasticized polyvinyl chloride below said second sheet of thermoplastic material with a first surface of said second sheet of polyvinyl chloride in contact with a second surface of said second thermoplastic material said polyvinyl chloride sheets having a bonding temperature lower than the bonding temperature of said thermoplastic materials;
    wherein said thermoplastic materials are selected from the group consisting of polyvinyl fluoride, polyetheretherketone and polymide;
    applying pressure against said polyvinyl chloride sheets thereby forcing said thermoplastic sheets together and applying rf energy to said polyvinyl chloride sheets and said first and second sheets to effectively soften and bond said first and second thermoplastic sheets wherein said rf energy is applied at about 27 MHz.

* * * * *